United States Patent [19]

Shelton et al.

[11] 4,343,579

[45] Aug. 10, 1982

[54] NAIL STACK

[75] Inventors: Lawrence S. Shelton, Morton Grove; Dieter G. Boigk, Skokie; William L. Gabriel, Schaumburg, all of Ill.

[73] Assignee: Signode Corporation, Glenview, Ill.

[21] Appl. No.: 73,935

[22] Filed: Sep. 7, 1979

[51] Int. Cl.³ .............................................. F16B 15/00
[52] U.S. Cl. .................................... 411/442; 206/345
[58] Field of Search .......................... 85/17, 10 R, 18; 206/345, 346, 344, 343, 347; 411/442, 443

[56] References Cited

U.S. PATENT DOCUMENTS 3,276,576 10/1966 Langas et al. ................. 206/345 X
3,471,008 10/1969 Reich et al. ......................... 206/344
3,736,198 5/1973 Leistner .......................... 206/344 X Primary Examiner—Ramon S. Britts
Attorney, Agent, or Firm—Dressler, Goldsmith, Shore, Sutker & Milnamow, Ltd.

[57] ABSTRACT

An adhered strip of nails that are held together, including a filament disposed under compression between the nail shanks to maintain the spacing between the shanks. The nails are also adhered by at least one adhesive tape extending across the shanks of the nail, which tape covers the filament and leaves an open area between the nail shanks other than the tape and said filament.

8 Claims, 4 Drawing Figures

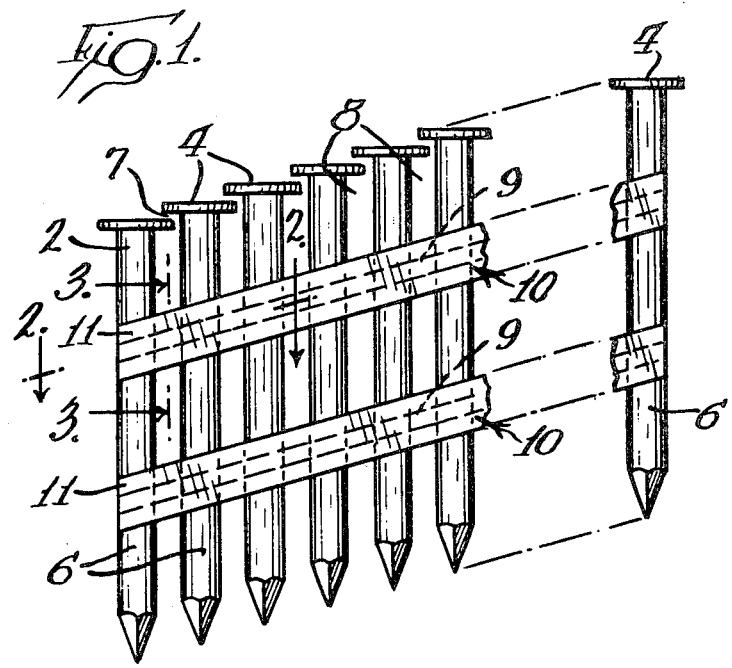
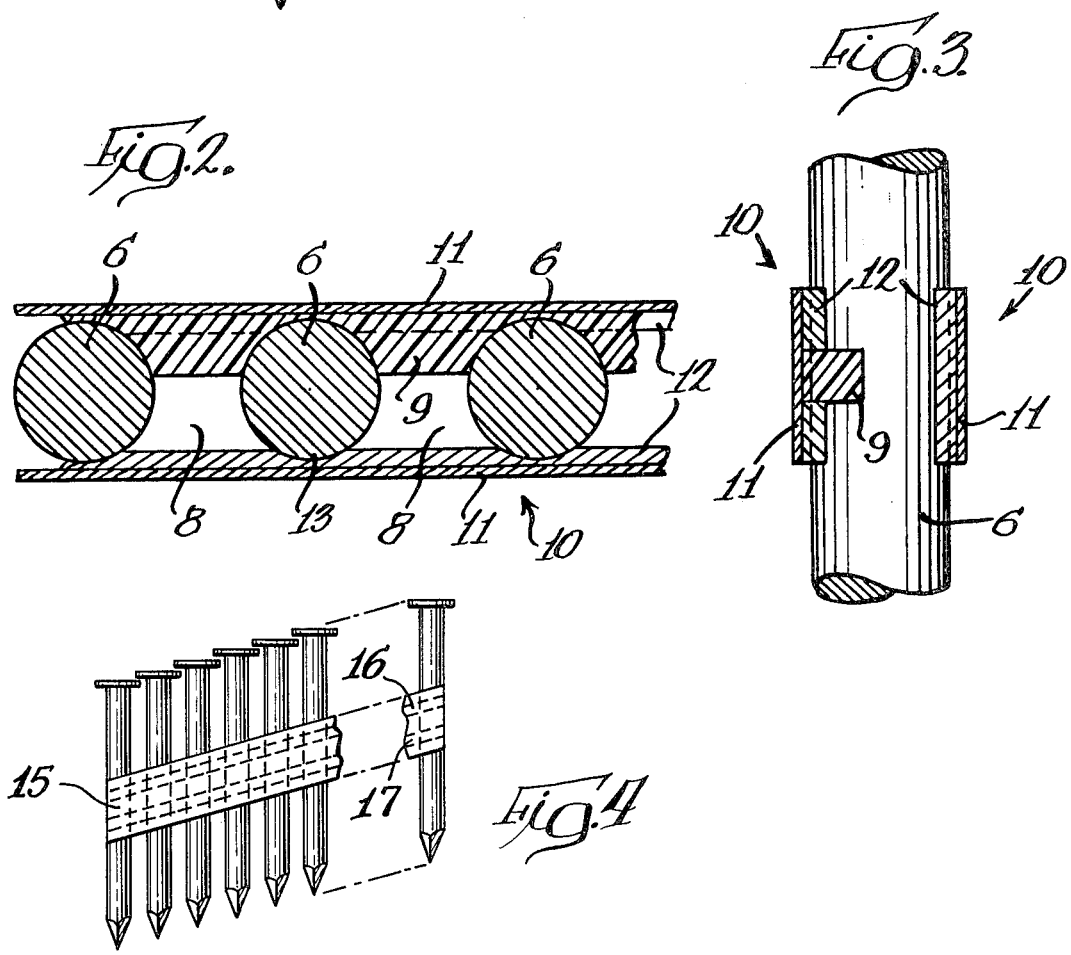

NAIL STACK

This invention relates to adhered strips of nails and particularly to a strip of full-headed, or "common," nails for use in magazines of rapid-acting fastener driving tools.

Today, fast-acting fastener driving tools are a very commonplace tool that is used extensively in the building industry. In order to obtain maximum utilization of these tools, it is necessary to have nails available in strip form for use in the magazines of such tools. Nails properly assembled in strip form can be handled conveniently, and thus a minimum amount of time is necessary to load the nail magazines.

There are currently available on the market various kinds of nail strips of full-headed nails that contain a number of disadvantages which if overcome will make a valuable contribution to the art. Nail strips currently available, as evidenced by U.S. Pat. No. 3,315,436, include substantial material between the nail shanks to hold them together, which results in substantial debris being located about the tool when it is being operated. One of the more common types of materials used to hold nails together consists of thick, plastic material disposed between the nail shanks, which material is separated from the nail and shattered during the nail driving action, with resultant large quantities of the material being disposed around the area where the tool is being used. In addition, the bulky material requires a substantial shearing force to separate the individual nails. The prior utilization of such plastic material was thought to be necessary in order to maintain the nails in a strip form so that the nail strip would be rigid, but still be sufficiently flexible to prevent the strip from fracturing in the event the strip is dropped, or otherwise carelessly handled. In essence, they were willing to accept the debris in order to provide a nail strip that could be used and have the other advantages above referred to. One of the further disadvantages, in addition to the debris, of course, was that the material before being ejected from the tool could result in clogging of the tool during the driving action. This clogging action would seriously affect the speed at which the tool could be operated and thus would tend to seriously impair its efficiency.

In accordance with the present invention, there is provided a nail strip which has all the advantages of existing strips, but has substantially none of the disadvantages. The strips are rigid but flexible enough for ease of handling and have the bare minimum of material between the nail shanks, so that the quantity of debris that exists during operation is insignificant and the shear force required to sever the nails from the strip is not large. In the novel nail strip of this invention, the nails are maintained in positive spaced relationship by the introduction of a filament between the adjacent nail shanks. The filament is applied to the nails between the shanks when they are in a heated condition (around 500° F.). The filament is very thin, but can withstand compression and thus assure that the spacing of the nails is positively maintained. The nails in the strip are further adhered together and maintained in their previously disposed stepped relationship by a tape coated with an adhesive that secures the shanks to the tape. The tape is in tangential relationship with the nail shanks and extends generally parallel to a line interconnecting the nail heads. The location of the filament between the nails as aforementioned maintains the positive spaced relationship of the nail shanks, but only introduces a very minimum of material into the hitherto free space between adjacent nail shanks. Thus, it can be appreciated that during the driving action, there is a very small amount of material that will be disposed in the nose of the tool and thus ejected from the tool. This minimum amount of material substantially eliminates clogging within the nose of the fastener driving tool and greatly minimizes the amount of debris located about the tool during the operation thereof.

The tape is adhered to the nails to hold the nails together to form the nail strip. The adhesive tape just engages a small portion of the shank of the nails, and is located on both sides of the nail row. The assembled nail stack is sufficiently resilient to permit limited flexing, but, on the other hand, is sufficiently rigid to permit ready insertion into the magazine.

The advantages and features of this invention will be seen from the following description, taken in connection with the drawings, in which:

FIG. 1 is an adhered strip of nails in which the nails are disposed in a tiered relationship and are formed into an adhered array by a filament disposed between the nails and a tape with an adhesive backing extending across the nail shanks;

FIG. 2 is a cross section taken along line 2—2 of FIG. 1;

FIG. 3 is a view taken along line 3—3 of FIG. 1; and.

FIG. 4 is a view showing a nail strip having a single wide tape and having two spaced filaments disposed thereunder.

Referring first to FIG. 1, there is shown an adhered strip of common nails 2 having full heads 4 and cylindrical shanks 6. The nails 2 are angularly disposed, with head 4 of one nail being located beneath the head 4 of the nail located on its right and slightly spaced from the shank portion 6 of the adjacent nail. The space 7 between the overlapped heads can be varied, depending on the configuration the strip is to take. The shanks 6 are spaced apart an amount generally equal to, but slightly greater than the width of the overhanging head portion, as indicated at 8 on the drawings.

A typical strip configuration is one in which the nails form an angle of about 30° with the horizontal when they are mounted for firing in the magazine of a fastener driving tool. When located in the magazine, the head portion of the lowermost nail of the strip not covered by the adjacent nail is exposed to the nail driver, whereby the nail may be driven into the workpiece.

The nails are retained in the spaced relationship shown in FIG. 1 by the filament 9 provided between the nail shanks 6, as shown in FIG. 2, and by the tapes 10, which include a paper tape 11 coated on its underside with a heat-responsive plastic adhesive 12. The tape strips 10 are mounted on both sides of shank 6 and are in tangential contact with the shanks, as indicated at 13. The tape engages the medial portion of the shank 6 and extends in a direction parallel to a line adjoining the heads of the nails. During the assembly operation, the nails are heated to a high temperature, i.e., 500° F., and the filament strip and heat-responsive adhesive are melted by the heated nails and adhered to the nail shanks. The filament is loaded under compression and serves to maintain the spacing between the nails.

It can be appreciated that the nail strip so formed will have a limited amount of resiliency to prevent fracture in the event the strip is dropped, but will maintain the strip in its assembled form, so that it may be readily inserted into a magazine designed to receive same in proper position for firing.

With the above, it can be seen that the amount of material located between the adjacent shanks is limited to the comparatively thin filament 9, which has a relatively small width compared to the tape employed, and results in only a minimal amount of material in the tool that has to be ejected therefrom during the operation of the tool. A preferred material for the filament bead is a polypropylene, or similar plastic material, and the adhesive used for the tape can, for example, be an ethylene vinyl acetate, a modified polypropylene, or polyethylene. In addition to the advantages of the minimum amount of material provided between the nail strips to minimize clogging, it can be, of course, appreciated that this minimum material also minimizes the amount of shear force necessary to separate the nails from the strip, or material flying off like a projectile, as is true with other nail carrier materials. The filament is selected of a material that will not adhere to the nail but can adhere to the adhesive.

In referring then to FIG. 1, it is to be noted that there are shown axially spaced tapes located on opposite sides of the nail shanks for adhering the nails together, and that in each of these assemblages there is provided a single filament extending across the shanks. It can, of course, be seen from FIG. 4 that a single wider tape 15 can be applied, and in such instance it may be desirable to employ spaced filaments 16, 17 thereunder.

While various embodiments have been referred to, it is to be understood that changes could be made without departing from the spirit or scope of the invention. For example, while the nail heads as shown in FIG. 1 are illustrated as being slightly spaced apart, they could be in contact with the adjacent shanks, since the nails are maintained in their relative positions by the adhering means and do not depend on the contact between the head and adjacent shank. Also the nails to be adhered could take other forms, such as screw nails. In addition, the filament could take the shape of a solid cylinder or tubing to maximize stiffness to keep the nails in the proper angular relationship.

It is, of course, intended to cover by the appended claims all such embodiments as fall within the true spirit and scope of the invention.

We claim:

1. An adhered strip of nails for a rapid-acting driving tool magazine comprising a plurality of nails, each having a full head and a cylindrical shank, said nails being disposed in stepped relationship with the head of one nail being located in overlapping relationship with the head of an adjacent nail, and said shanks being spaced apart from each other to define an open area between adjacent shanks, means for connecting said nails to form a strip comprising at least one adhesive tape extending across a first portion of the shank of each adjacent nail and adhered to the nail shanks under tension in tangential contact therewith to keep the nails together, filament means having a width that is a fraction of the width of said tape and disposed under compression between said nail shanks and adhered to the tape to maintain the requisite spacing between said shanks while minimizing clogging problems and the shear force necessary to separate nails from the strip, which leaves said open area void of material other than said filament, said tape including a heat-responsive adhesive to provide a connection between said tape and said nails when said tape is pressure-applied to the nails while the nails are in a heated condition.

2. An adhered strip of nails as set forth in claim 1 in which the tape includes a hot melt adhesive for holding the nails together.

3. An adhered strip of nails as set forth in claim 2 in which the hot melt adhesive is an ethyl vinyl acetate.

4. An adhered strip of nails as set forth in claim 1 in which the tape includes a modified polypropylene material.

5. An adhered strip of nails as set forth in claim 1 in which the filament means comprises a single filament disposed under said tape.

6. An adhered strip of nails as set forth in claim 1 in which the filament means includes a pair of spaced filaments disposed under said tape.

7. An adhered strip of nails for a rapid-acting driving tool magazine, comprising a plurality of nails, each having a full head and a cylindrical shank, said nails being disposed in stepped relationship with the head of one nail being located in overlapping relationship with the head of an adjacent nail, and said shanks being spaced apart from each other to define an open area between adjacent shanks, filament means disposed under compression between said nail shanks to maintain the requisite spacing between said shanks while minimizing clogging problems and the shear force necessary to separate nails from the strip; means for connecting said nails to form a strip comprising a first adhesive tape having a width in excess of twice the width of said filament, extending across said filament means and a first portion of the shank of each adjacent nail in tangential contact therewith and adhered to the nails under tension to keep the nails together, which leaves said open area void of material other than said filament, a second adhesive tape extending across a portion of the shank of each adjacent nail diametrically opposite to said first shank portion in tangential contact therewith and adhered to the nails under tension to keep the nails together, thus continuing to leave said open area void of material other than said filament secured to only said first tape, said first and second adhesive tapes each comprising a front portion and a backing portion including a heat responsive adhesive to provide a connection between said tape and said nails when said tape is pressure applied to the nails while the nails are in a heated condition, said first and second adhesive tapes each extending across said shanks in a direction parallel to the line formed by the adjacent nail heads, said first and second adhesive tapes each being of a width that is less than the length of the nails to which it is connected.

8. An adhered strip of nails as set forth in claim 7 in which the nails are secured in spaced relationship by a pair of parallel spaced assemblies each consisting of a single filament between the nail and first and second tape means disposed on opposite sides of the nail shanks.

* * * * *